United States Patent Office 3,060,050
Patented Oct. 23, 1962

3,060,050
BLACK MASTERBATCH PREPARATION
Pritchard P. Ells, Baytown, Tex., assignor to United Rubber & Chemical Company, Baytown, Tex., a corporation of Delaware
No Drawing. Filed May 11, 1960, Ser. No. 28,232
3 Claims. (Cl. 106—307)

This invention relates to synthetic rubber latexes. More particularly, it relates to an improved process for preparing carbon black-synthetic rubber latex masterbatches.

Synthetic rubber latexes are prepared, in general, by the emulsion polymerization of a butadiene-1,3 or mixtures thereof, or by the polymerization of a butadiene-1,3 with other compounds polymerizable therewith. Polymerization is conducted in an aqueous medium using any of various polymerization recipes. The reaction is short-stopped at the desired point, after which the resultant latex is coagulated with acid or salt and acid. The coagulated polymer is then subjected to washing, filtering and drying operations.

In the preparation of black masterbatches, carbon black is added to the latex prior to coagulation usually as an aqueous dispersion. Concentrated aqueous carbon black dispersions of manageable viscosities are readily prepared by the use of any of various chemical dispersing agents well known in the art. In order to control tack and particle size of the coagulum obtained on coagulating a latex masterbatch prepared with such a dispersion, however, it has generally been found necessary to use a salt-acid coagulating system. Unfortunately, the presence of salt has also been found to influence the heat stability of the coagulum or crumb, as well as resulting in a final rubber having a high water soluble ash content. It has also been contended that the presence in the rubber of the dispersing agent itself has been detrimental to the rubber.

Accordingly, in order to minimize these disadvantages, much effort has been spent towards preparing concentrated aqueous black slurries of manageable viscosities without the use of dispersing agents. To this end, various mechanical dispersing systems have been devised which render unnecessary the use of a dispersant and, accordingly, the necessity of using a salt-acid or other electrolyte-acid coagulating system. Unfortunately, however, it has been found that such mechanically formed dispersions are characterized by a much faster settling rate of carbon black than dispersions containing a dispersing agent. The problems and disadvantages that can arise from such a characteristic, particularly when conveying such a dispersion through extended pipe lines, are apparent. While carbon black drop-out can be minimized by conveying the dispersion at high velocities thereby creating turbulence, this does not improve the inherent stability of the dispersion.

It is a principal object of this invention, therefore, to provide an improved process of preparing an aqueous carbon black dispersion. It is a further object of this invention to provide a process of preparing an aqueous carbon black dispersion without the use of a chemical dispersing agent. It is an additional object of this invention to provide an aqueous carbon black dispersion of improved stability and which may be readily conveyed through pipe lines without excessive carbon black drop-out.

These objects have been met according to this invention in a relatively simple yet unusually effective manner. In general, the process of this invention comprises incorporating in an aqueous non-dispersing agent-bearing carbon black dispersion any of various hydrocarbon oils normally employed as extender or processing oils in the manufacture of synthetic rubbers. Thorough blending of the oil and dispersion results in a surprisingly stable aqueous oil-black dispersion which may be stored for extended periods and/or conveyed through conventional piping systems with a minimum of carbon black settling and plating thereof on equipment surfaces.

Although the process of this invention is particularly concerned with latexes prepared by emulsion polymerization of butadiene-1,3 with styrene using a soap type emulsifier such as a rosin acid or fatty acid soap, nevertheless, it is just as applicable to other latexes similarly produced. By the latter is meant those latexes formed by the emulsion polymerization of a butadiene-1,3, such as butadiene-1,3, methyl-2-butadiene-1,3, chloro-2-butadiene-1,3, piperylene-2,3-dimethyl butadiene-1,3 and the like as well as mixtures thereof. Also intended to be included are those latexes formed by the emulsion polymerization of a butadiene-1,3 with one or more compounds polymerizable therewith containing a terminal $CH_2=C<$ group. Examples of such compounds are aryl olefins including styrene mentioned above such as $\alpha$-methylstyrene, p-chlorostyrene and the like; and the $\alpha$-methylene carboxylic acids, their esters and nitriles such as acrylic acid, methyl acrylate, methyl methacrylate, acrylonitrile, methacrylonitrile; and vinyl aliphatic compounds such as methyl vinyl ether, methyl vinyl ketone and the like.

The hydrocarbon oil employed in the process of this invention is preferably any naphthenic, aromatic or highly aromatic oil generally employed as an extender or as a processing aid in the manufacture or use of synthetic rubbers. As set forth on pages 9 and 10 of a paper entitled "Latex Masterbatching" presented by Dr. I. Drogin at the International Rubber Conference, Washington, D.C., November 8–13, 1959, such extender oils have been characterized as predominantly the high resinous portions of high boiling petroleum distillates from which the paraffinic material has been largely extracted. The following gravity and viscosity specifications on extender oils were established in the Government synthetic rubber program:

| | Naphthenic | Aromatic | Highly Aromatic |
|---|---|---|---|
| Specific Gravity 60° F./60° F. | 0.935–0.965 | 0.965–0.995 | 0.965–1.050 |
| Viscosity, SUS @ 210° F | 100 Maximum. | 100 Maximum. | 300 Maximum. |

Excellent results are obtained by adding to the black as little as about 5.0% by weight of oil on the black although amounts considerably in excess of this may be employed. When an oil is also to be incorporated in latex to serve as an oil extender or as a processing aid, the entire amount of oil for this purpose is blended with the latex with the result that the advantages of this invention are inherently obtained. When the oil is not intended to serve as an extender or processing aid, the amount of oil employed will usually be about 5–10%. Preferably, the oil will be added to the black as an aqueous emulsion, as is the usual practice when adding extender oils or processing aids to latex, although it may be added in its raw state if desired. Addition of the oil may be made as the black dispersion is being mechanically prepared or after the mechanical dispersion has been formed. In either event, addition of the black is accompanied by violent agitation so as to obtain a thorough coating of the black with the oil.

The process of this invention and the advantages gained by the practice thereof are particularly surprising in view of conventional commercial practice. When preparing oil-extended latex masterbatches using aqueous black dispersions containing chemical dispersing agents, the usual practice is to blend the oil with the latex which is then mixed with the black slurry and coagulated. While it has been proposed to incorporate the oil in the dispersing agent-black dispersion for various reasons, such practice results in no improvement in dispersion stability nor, in view of the already excellent stability of the dispersion, would there be any reason to expect or even look for such improvement. In view of this, therefore, the unusual improvement obtained in stability when blending an oil with an aqueous non-dispersing agent-black dispersion is the more unexpected.

The following examples further demonstrate the process of this invention. These are intended to be illustrative only and not by way of limitation. Unless otherwise noted, all parts are by weight. Example 1 illustrates the prior art.

*Example 1*

A carbon black-latex masterbatch is prepared using 100 parts latex, 50 parts HAF carbon black and 25 parts of an aromatic processing oil (Sundex 53, a highly aromatic process oil with chemical unsaturation). The latex is a butadiene-styrene copolymer prepared by emulsion polymerization using a 50/50 mixture of rosin and fatty acid soaps. The carbon black is prepared by mechanical dispersion in the absence of a dispersing agent as a 15% aqueous dispersion. The oil in the form of an aqueous dispersion is blended with the latex. The aqueous black dispersion and latex are brought together at appropriate rates and coagulated with dilute $H_2SO_4$. Considerable settling out of carbon black occurs in the pipe lines as the aqueous black slurry is conveyed to the coagulating tank. Over a period of time, the equipment surfaces become heavily plated with carbon black.

*Example 2*

The procedure of Example 1 is repeated except that the aromatic processing oil is blended with the aqueous carbon black dispersion. Little settling out of black occurs as the slurry is conveyed to the coagulating tank.

*Example 3*

The procedure of Example 1 is repeated using 10% of the oil by weight of the carbon black. Similar results are obtained.

Similar improved stability is obtained using other oils and other blacks both in varying amounts.

I claim:

1. In the preparation of black masterbatch in which a dispersing agent-free aqueous dispersion of carbon black is added to a synthetic rubber latex and the resultant mixture subjecting to coagulation, the improvement for minimizing the settling out of carbon black from said dispersion prior to its addition to the synthetic latex which comprises: incorporating in said dispersion at least about 5% by weight of the carbon black of a synthetic rubber extender oil selected from the group consisting of naphthenic, aromatic and highly aromatic mineral oils.

2. An improved process according to claim 1 in which the oil is incorporated as an aqueous emulsion.

3. An improved process according to claim 1 in which the oil is incorporated in unemulsified form.

References Cited in the file of this patent

UNITED STATES PATENTS

| | | |
|---|---|---|
| 2,046,757 | Tucker | July 7, 1936 |
| 2,050,193 | Park | Aug. 4, 1936 |
| 2,167,674 | Offutt | Aug. 1, 1939 |
| 2,769,795 | Braendle | Nov. 6, 1956 |
| 2,813,040 | Rowe et al. | Nov. 12, 1957 |
| 2,848,347 | Rushford | Aug. 19, 1958 |

OTHER REFERENCES

The Rubber Age and Synthetics, volume 32, No. 6, August 1951, pages 198, 199 and 200.